US006914473B2

(12) United States Patent
Hohenwarter

(10) Patent No.: US 6,914,473 B2
(45) Date of Patent: Jul. 5, 2005

(54) ARRANGEMENT FOR DRIVING DISPLAY UNITS WITH AN ADAPTIVE START SEQUENCE

(75) Inventor: Harald Hohenwarter, Pfaeffikon (CH)

(73) Assignee: Koninklijke Philips Electronics N.V., Eindhoven (NL)

( * ) Notice: Subject to any disclaimer, the term of this patent is extended or adjusted under 35 U.S.C. 154(b) by 320 days.

(21) Appl. No.: 10/081,891

(22) Filed: Feb. 21, 2002

(65) Prior Publication Data

US 2002/0130708 A1 Sep. 19, 2002

(30) Foreign Application Priority Data

Feb. 23, 2001 (DE) .......................................... 101 08 980

(51) Int. Cl.[7] .................................................. G05F 3/02
(52) U.S. Cl. ........................ 327/535; 327/534; 327/536; 327/540; 327/545
(58) Field of Search ................................ 327/535, 536, 327/540, 541, 543, 546; 365/227–229

(56) References Cited

U.S. PATENT DOCUMENTS

| | | | | | |
|---|---|---|---|---|---|
| 5,388,084 | A | * | 2/1995 | Itoh et al. | 365/185.23 |
| 5,499,183 | A | * | 3/1996 | Kobatake | 363/59 |
| 5,568,083 | A | * | 10/1996 | Uchiyama et al. | 327/538 |
| 5,708,387 | A | * | 1/1998 | Cleveland et al. | 327/536 |
| 5,754,417 | A | * | 5/1998 | Nicollini | 363/60 |
| 5,841,725 | A | * | 11/1998 | Kang et al. | 365/226 |
| 5,994,888 | A | * | 11/1999 | Yanagawa | 323/313 |
| 6,023,188 | A | * | 2/2000 | Lee et al. | 327/536 |
| 6,041,012 | A | * | 3/2000 | Banba et al. | 365/226 |
| 6,052,022 | A | * | 4/2000 | Lee | 327/589 |
| 6,255,896 | B1 | * | 7/2001 | Li et al. | 327/536 |
| 6,285,622 | B1 | * | 9/2001 | Haraguchi et al. | 365/226 |
| 6,366,158 | B1 | * | 4/2002 | Zeng et al. | 327/536 |
| 6,441,678 | B1 | * | 8/2002 | Zeng et al. | 327/536 |
| 6,487,120 | B2 | * | 11/2002 | Tanzawa et al. | 365/185.18 |
| 6,518,828 | B2 | * | 2/2003 | Seo et al. | 327/534 |
| 6,522,193 | B2 | * | 2/2003 | Shin | 327/536 |
| 6,531,912 | B2 | * | 3/2003 | Katou | 327/536 |
| 6,538,930 | B2 | * | 3/2003 | Ishii et al. | 327/536 |

* cited by examiner

Primary Examiner—Terry D. Cunningham
(74) Attorney, Agent, or Firm—Kevin Simons

(57) ABSTRACT

The invention relates to a circuit arrangement which includes a subvoltage generating unit and a voltage multiplier for generating at least one voltage Vmult, it being arranged to control the voltage multiplier by switching the voltage multiplier to a direct mode during a start time. The invention also relates to an arrangement for driving a display device, to a display device which includes such an arrangement, to an electronic apparatus which is provided with a display device for the display of image data which includes an arrangement for driving the display unit, and to a method of starting a circuit arrangement 15 which includes a subvoltage generating unit 40, a voltage multiplier 20 and a start control unit 30. In order to enable reliable and fast starting of such a circuit arrangement 15 while effectively using the available current and space at the same time, it is proposed to switch the voltage multiplier 20 to a direct mode by means of an initial start signal 36 during an adaptive start time ts, the variation of an activation signal 32 generated in the start control unit 30 being monitored and the control of the voltage multiplier (20) taking place in dependence thereon.

18 Claims, 4 Drawing Sheets

ARRANGEMENT FOR DRIVING DISPLAY UNITS WITH AN ADAPTIVE START SEQUENCE

Figure 1:
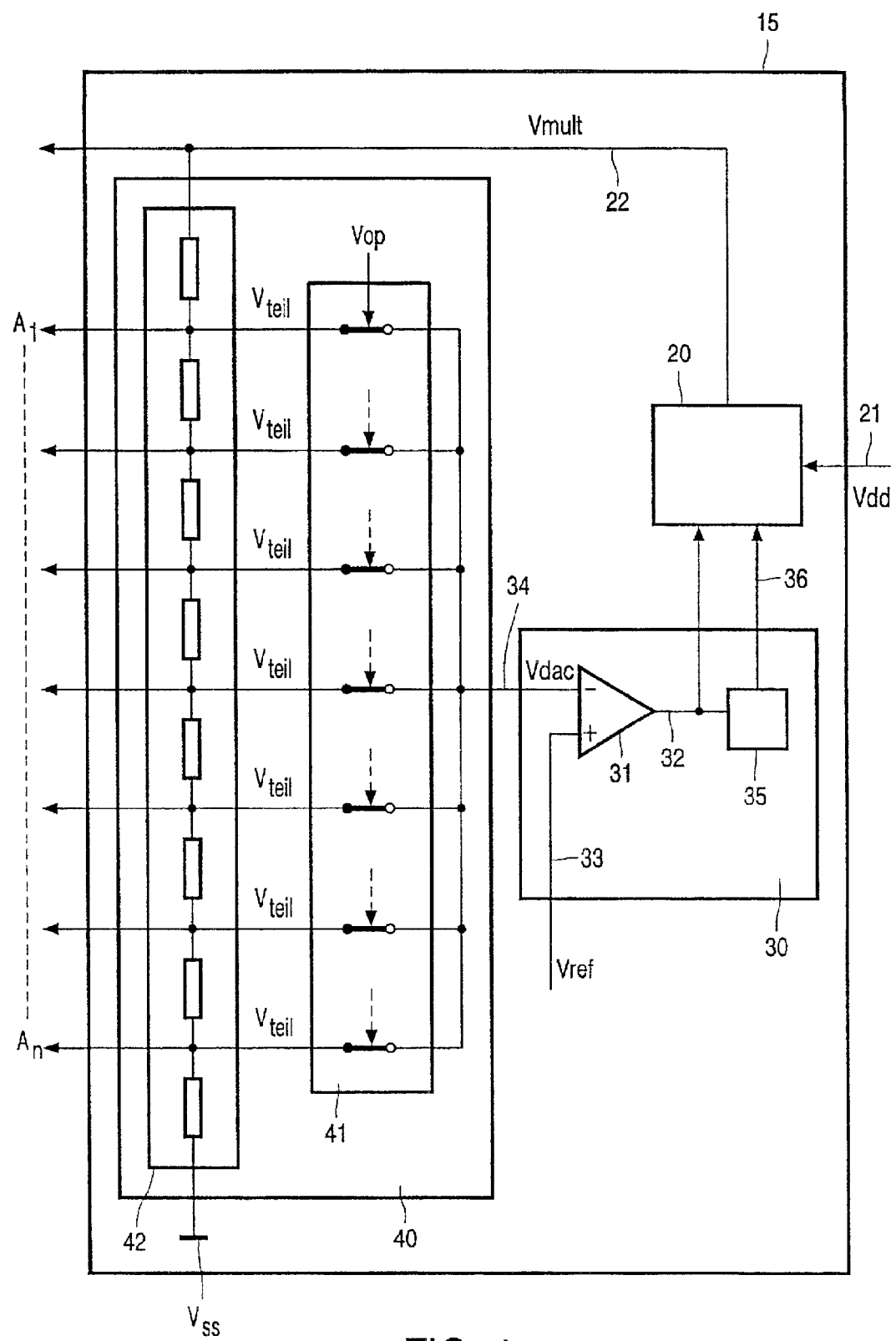

The invention relates to a circuit arrangement which includes a subvoltage generating unit and a voltage multiplier for generating at least one voltage. The invention also relates to a voltage multiplier for generating at least one voltage value and an arrangement for driving a display device, to a display device which is provided with such an arrangement, and to an electronic apparatus which includes a display unit for the display of image data and also an arrangement for driving said display unit.

Voltage multipliers are required in apparatus in which a voltage higher than the available supply voltage is necessary. Such voltage multipliers are used notably for driver circuits for display devices. The driving of contemporary liquid crystal displays requires the use of voltages which are several times higher than the supply voltage for the driver circuit. Voltage multiplier circuits are customarily constructed as charge pumps which are driven by the available system supply voltage and increase the system supply voltage to the necessary output voltage by way of a series connection of pumping stages, each of which consists in principle of a switch or a diode and a capacitor.

The display technique will play an increasingly more important role in the information and communication technique in the coming years. As an interface between humans and the digital world, the display device is of crucial importance for the acceptance of contemporary information systems. Notably portable apparatus such as, for example, notebooks, telephones, digital cameras and personal digital assistants cannot be realized without utilizing displays. Driver circuits or driving arrangements are used for driving such display devices or displays. The driver circuits convert the image signals to be displayed on a display. The image information is stored in the form of digital signals in storage media. Such digital signals must be converted into analog signals so that a corresponding contrast can be realized on the display by way of an analog voltage.

Display units are nowadays manufactured in large numbers for which a high current efficiency is a principal condition to be satisfied.

The above display devices are used mainly in battery-operated apparatus, so that a low power consumption and a corresponding current efficiency become increasingly more important. Moreover, the room available in such apparatus plays a decisive role, so that every saving of, space and reduction of weight constitutes a major improvement. Components which are not necessary, or components that are only briefly necessary, are additional consumers of power which have a corresponding power consumption also during their inactive periods.

DE 19639701 discloses a control circuit for voltage multipliers in which the output voltage is monitored. A control signal which is dependent on the output voltage is applied to the drivers of a charge pump via a comparator. This enables the charge pump to be switched on or off in dependence on the output voltage.

Undefined states at the start of this circuit may give rise to incorrect operation of the circuit. The uncertain states are due to undefined voltages in the initial state of the charge pump and its control circuit. For example, the generating of the subvoltage may be undefined and the subvoltage which is compared with an externally supplied reference voltage may be larger than the reference voltage, so that the charge pump is not started and the output voltage of the charge pump cannot increase, thus ultimately leading to incorrect operation of the overall arrangement.

When the charge pump is started, the voltage value at the output of the charge pump amounts to zero volts or is undefined, so that the individual subvoltage values are also undefined and the comparison in the comparator may possibly yield a signal to the charge pump that voltage multiplication is not necessary.

An additional requirement imposed on such circuits relates to the various loads whereto the circuit can be subjected.

Therefore, it is an object of the invention to provide a circuit arrangement with an automatic, reliable and adaptive start sequence in conjunction with a low power consumption and low requirements as regards space in a circuit arrangement.

This object is achieved by means of a circuit arrangement for generating at least one voltage value, which circuit arrangement includes a subvoltage generating unit and a voltage multiplier, it being arranged to switch the voltage multiplier to a direct mode in order to control the voltage multiplier during a start time (ts).

The arrangement in accordance with the invention is necessary to deliver an increased voltage Vmult and a plurality of different subvoltage values which are dependent thereon. These voltage values are required, for example, for driving a display and must be very exact. Because some of the subvoltage values for driving a display are often higher than the available supply voltage values, a voltage multiplier is used. This voltage multiplier is programmable in respect of multiplication factor, for example, in that not all stages of the voltage, multiplier are activated. Because of the programmability of the voltage multiplier, each time only as many stages of the charge pump are activated as are required for the relevant application. The voltage multiplier can thus be adapted to the relevant application in respect of current consumption. The multiplication factor with which the voltage multiplier operates is dependent on the necessary subvoltage values which are determined by the supply voltage, display properties and image information to be displayed.

Displays can operate in different modes of operation which differ, for example, in respect of resolution. Low resolutions require subvoltage values which are lower than when the display operates with its maximum resolution. The programmability of the multiplication factor of the voltage multiplier is also advantageous in this respect.

In order to enable reliable and fast switching on of the arrangement, it is necessary that during a start time the operation of the arrangement is different from that in the normal mode. Therefore, it is proposed to start the voltage multiplier directly for the start time. To this end, it is arranged to supply the voltage multiplier with an activation signal and with an initial start signal. The initial start signal is applied to the voltage multiplier during a start time and switches the multiplier to a direct mode. The supply voltage Vdd is then applied directly to the output of the voltage multiplier, so that a defined output voltage of the voltage multiplier and defined subvoltage values can arise in the subvoltage generating unit. After a start time has elapsed and all necessary voltages and subvoltages have been adjusted, the voltage multiplier is controlled by way of the activation signal.

In a preferred embodiment of the invention the activation signal is formed from a subvoltage and a reference signal. The subvoltage is then generated in the subvoltage generating unit and the reference signal is externally supplied.

The initial start signal is generated by monitoring the activation signal. The initial start signal is applied to the voltage multiplier until the activation signal exhibits a stable logic state.

The initial start signal and the activation signal are generated in a start control unit. This unit is required for controlling the voltage multiplier during the start time and in the normal or regular mode of operation. After a defined output voltage has appeared on the output of the voltage multiplier, operating in the direct mode, defined subvoltage values also arise, so that the start control unit generates a defined activation signal and the voltage multiplier can change over to its regular mode of operation.

After the activation signal has assumed such a stable logic state, the voltage multiplier is controlled by the activation signal. The activation signal then controls whether the voltage multiplier is required for the multiplication of voltages or not.

The circuit arrangement in accordance with the invention includes a voltage multiplier and a subvoltage generating unit, the subvoltage values generated by the subvoltage generating unit being derived from the voltage Vmult generated by the voltage multiplier. In order to switch the voltage multiplier on or off or to influence its multiplication factor, a selectable subvoltage value is derived from the subvoltage generating unit so as to be applied to a start control unit. The selectable subvoltage value is applied to the start control unit by way of a switching unit which is associated with the subvoltage generating unit. The switching unit is preferably realized in the form of a transistor array, so that any available subvoltage can be applied to the start control unit in conformity with the relevant application.

The start control unit advantageously includes at least one comparator which is realized, for example, by way of a differential amplifier. This comparator receives a subvoltage value from the subvoltage generating unit. A reference voltage Vref from an external source is applied to the comparator as a reference signal. The comparison of these two values results in an activation signal. Using the activation signal and the initial state of the arrangement, an initial control signal is generated in the start control unit so as to be applied to the voltage multiplier. To this end, the activation signal is applied to a logic circuit which generates a self-adaptive start sequence which is applied to the voltage multiplier in the form of the initial start signal. In order to ensure that the time during which the voltage multiplier operates in the direct mode is as short as possible, it is necessary to monitor the activation signal from the comparator. Such monitoring of the state of the activation signal enables the time for the initial start sequence to be kept as short as possible.

As a result, the arrangement for driving display units can be adapted to many different applications. At the same time such monitoring of the state enables a reliable and fast start of the arrangement, that is, without requiring intricate additional circuit components so as to ensure a reliable start.

The reference signal applied to the comparator may describe, for example, a temperature function. Because display units may inter alia be dependent on temperature, it may be necessary to adapt the voltage values to the relevant temperature in the case of low temperatures.

The start time during which the voltage multiplier operates in the direct mode can be adaptively adjusted in a preferred embodiment of the invention. This ensures that the time in which the voltage multiplier operates in the direct mode is always as short as possible. In order to enable such adaptation of the start time, the following requirements have to be satisfied or realized. The voltage multiplier is to operate in the direct mode, that is, the supply voltage Vdd available is applied directly to the output of the voltage multiplier without the stages of the charge pump being activated. Furthermore, the subvoltage generating unit must be connected to the output voltage Vmult presented by the voltage multiplier, that is, the subvoltage generating unit receives the supply voltage Vdd during the start time. The reference voltage Vref is applied to the comparator; however, in this case the reference voltage Vref with the lowest temperature coefficient should be selected so as to be as independent of temperature as possible during this time. Moreover, the control voltages Vop for the switching unit for generating the subvoltage value for supply to the comparator should be switched to the maximum voltage possible. In this case the supply voltage Vdd is the maximum voltage possible.

The control voltages Vop for controlling the switching unit are derived from the output voltage of the voltage multiplier and may assume voltage values of between ground or Vss and Vmult. The subvoltage applied to the comparator is then dependent on the available subvoltage values of the voltage divider; the highest voltage during the start time cannot be higher than Vdd.

For a fast start of the arrangement it is advantageous when a small load is present at the output of the charge pump, so that capacitances of the arrangement can be charged as fast as possible. Therefore, should the magnitude of the load be adjustable, it should be adjusted to be as small as possible. This is achieved by switching off all connected driver circuits. i.e. for driving displays.

In an advantageous embodiment of the invention the charge pump is switched to the direct mode. The supply voltage Vdd is then connected directly to the output of the voltage multiplier or the charge pump. A charge pump consists of a series connection of a plurality of pump stages, each pump stage including at least one switch or a diode and a charge storage element. The switches are opened and closed in response to a periodic signal. In correspondence therewith the charge storage elements are charged by way of driver circuits. The charge thus present in each stage is then transferred from one stage to the next. In the direct mode the charge storage elements represent a capacitive load which must first be charged before the supply voltage appears at the output of the voltage multiplier. Consequently, it is proposed to disconnect these capacitances in the direct mode, that is, in such a manner that charging is no longer necessary and hence the start time can be reduced. Alternatively, the charge pump may be provided with a connection which bridges the stages of the charge pump in the direct mode and hence realizes a direct connection from the input of the voltage multiplier to its output.

The reduction of the components necessary for realizing a reliable start of the voltage multiplier simplifies the testing of such a circuit during its manufacture because, for example, only one comparator need be tested.

An arrangement of this kind can be developed further by introducing a further comparator which compares a different subvoltage value with a reference voltage, so that the two subvoltage values applied to the two comparators differ in each case, so that the charge pump can be reliably started in the switch-on state.

The object is also achieved by means of a voltage multiplier for generating at least one voltage value, containing a series connection of the stages with switching devices (SWn), switching devices (SCn) and capacitances (CSn), whereby during a starttime (ts) the switching devices (SWn) are closed and by this a supply voltage (vdd) at the input of the voltage multiplier is switched to the output of the voltage multiplier. By means of the switching devices SCn the capacitances could be switched off. This starting sequence will be described as direct mode and by this the voltage value will be reached faster. The direct mode can be used for free running voltage multipliers and for programmable voltage controlled voltage multipliers.

Preferably after the starttime the multiplication factor can be incremented step by step until the predefined multiplication factor is reached.

The object is also achieved by means of a circuit arrangement for driving a display device, which circuit arrangement includes a subvoltage generating unit and a voltage multiplier, it being arranged to switch the voltage multiplier to a direct mode during a start time (ts) in order to control the voltage multiplier by means of an initial start signal.

The subvoltage generating unit in a further preferred embodiment of the invention is used to provide different subvoltage values for driving the rows of a display and at the same time a subvoltage value for controlling the voltage multiplier. This results in an implementation of an arrangement for driving display units that is very efficient in respect of the required space and energy.

The object is also achieved by means of a display unit for the display of image data, which display unit includes an arrangement for driving the display unit with a subvoltage generating unit and a voltage multiplier, it being arranged to switch the voltage multiplier to a direct mode by means of at least one signal during a start time (ts).

The object is also achieved by means of an electronic apparatus which is provided with a display unit for the display of image data and also with an arrangement for driving the display unit, which arrangement includes a subvoltage generating unit and a voltage multiplier, it being arranged that at least one signal controls the voltage multiplier and that the voltage multiplier can be switched to a direct mode during a start time (ts).

The object is also achieved by means of a method of starting a circuit arrangement which includes a subvoltage generating unit and a voltage multiplier, in which method an activation signal is generated by comparison of a subvoltage value and a reference voltage, the voltage multiplier being switched to a direct mode during a start time (ts) which is adaptively adjusted by monitoring an activation signal.

Figure 2:
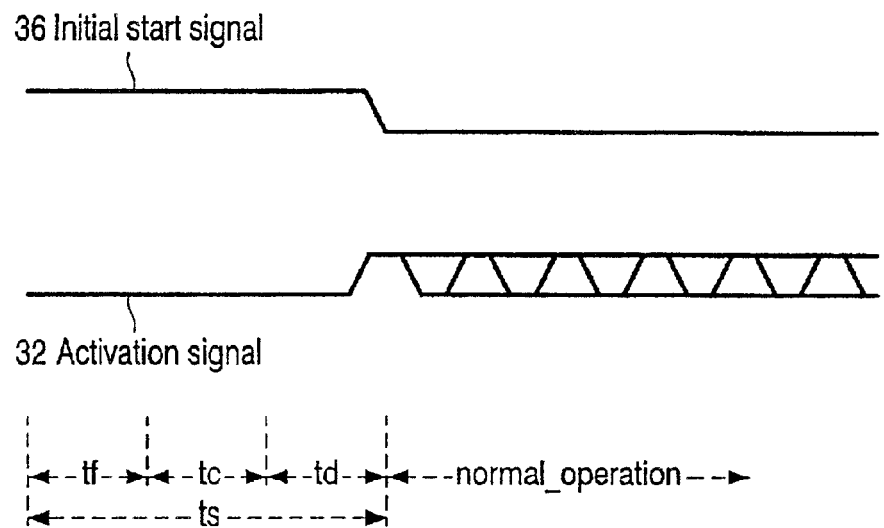
Figure 3:
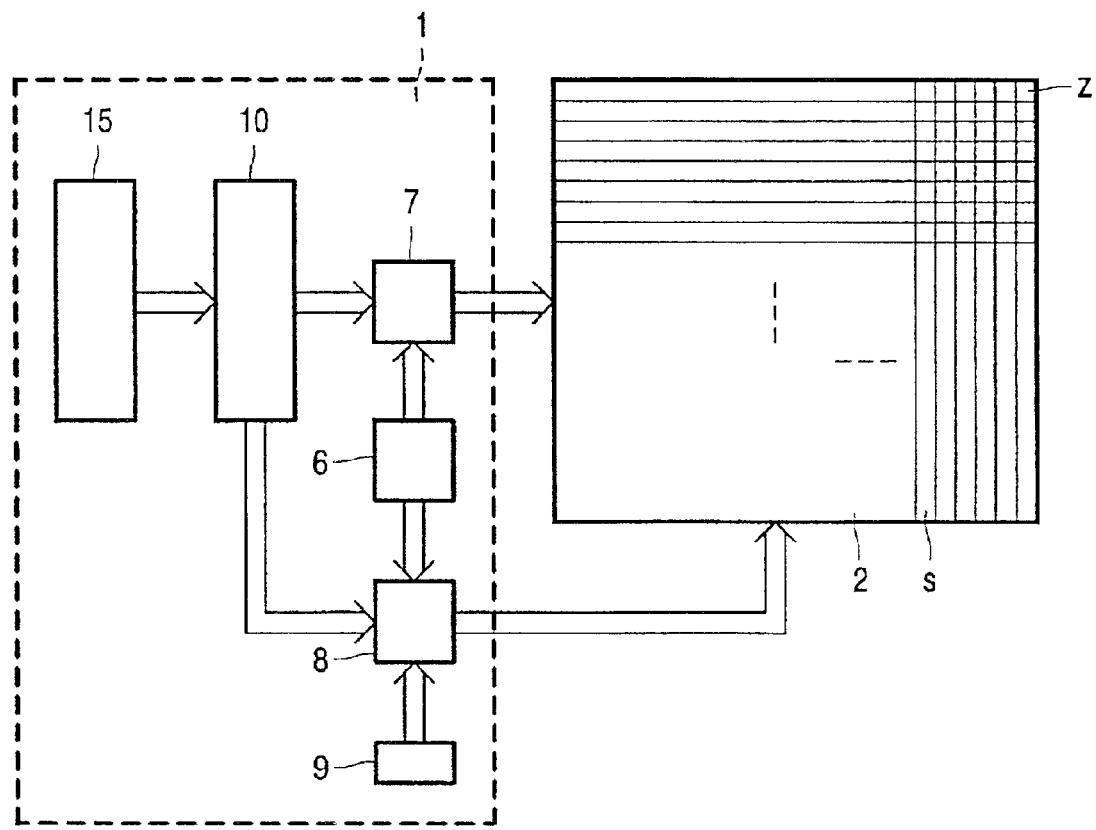
Figure 4:
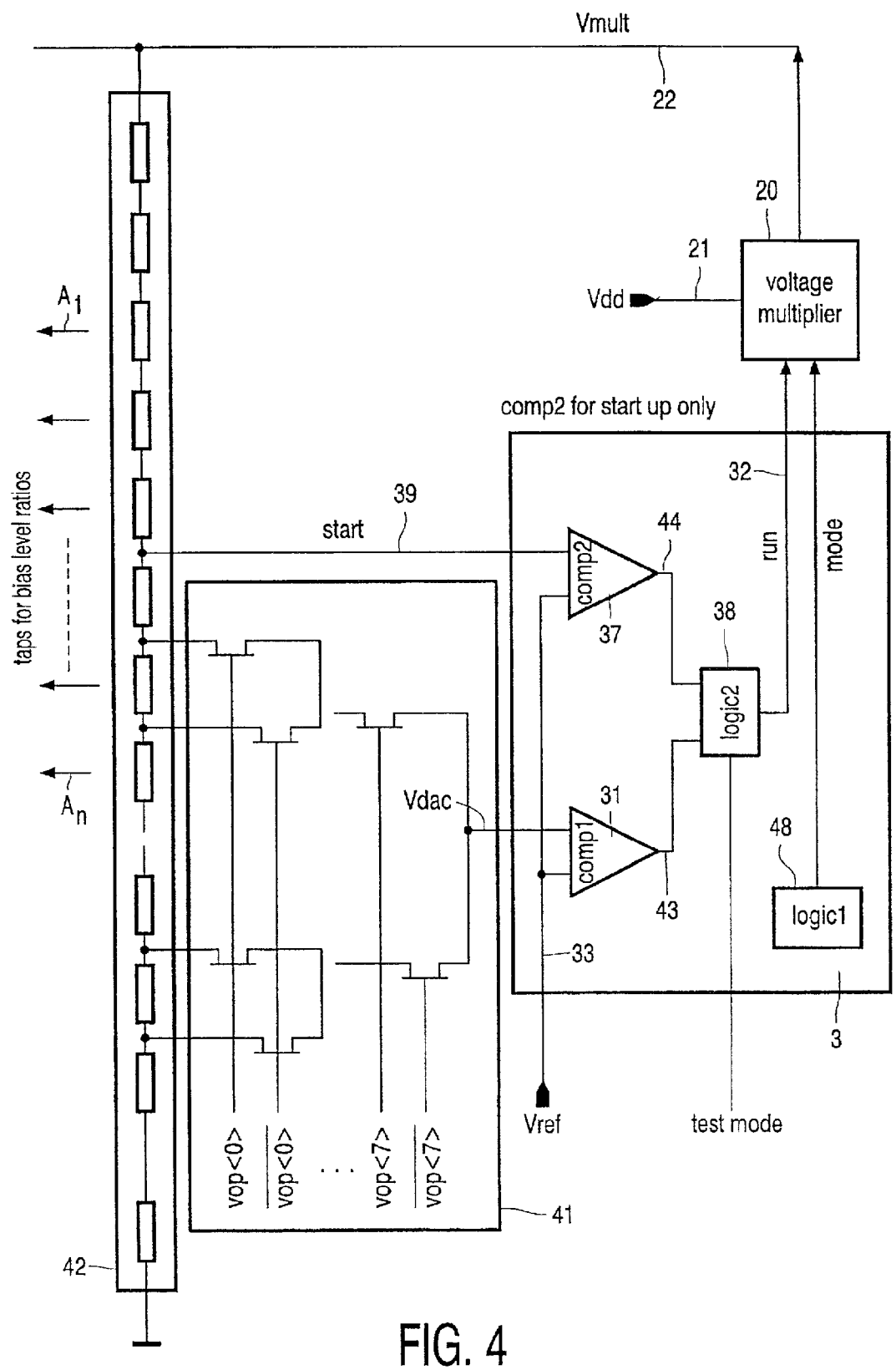
Figure 5:
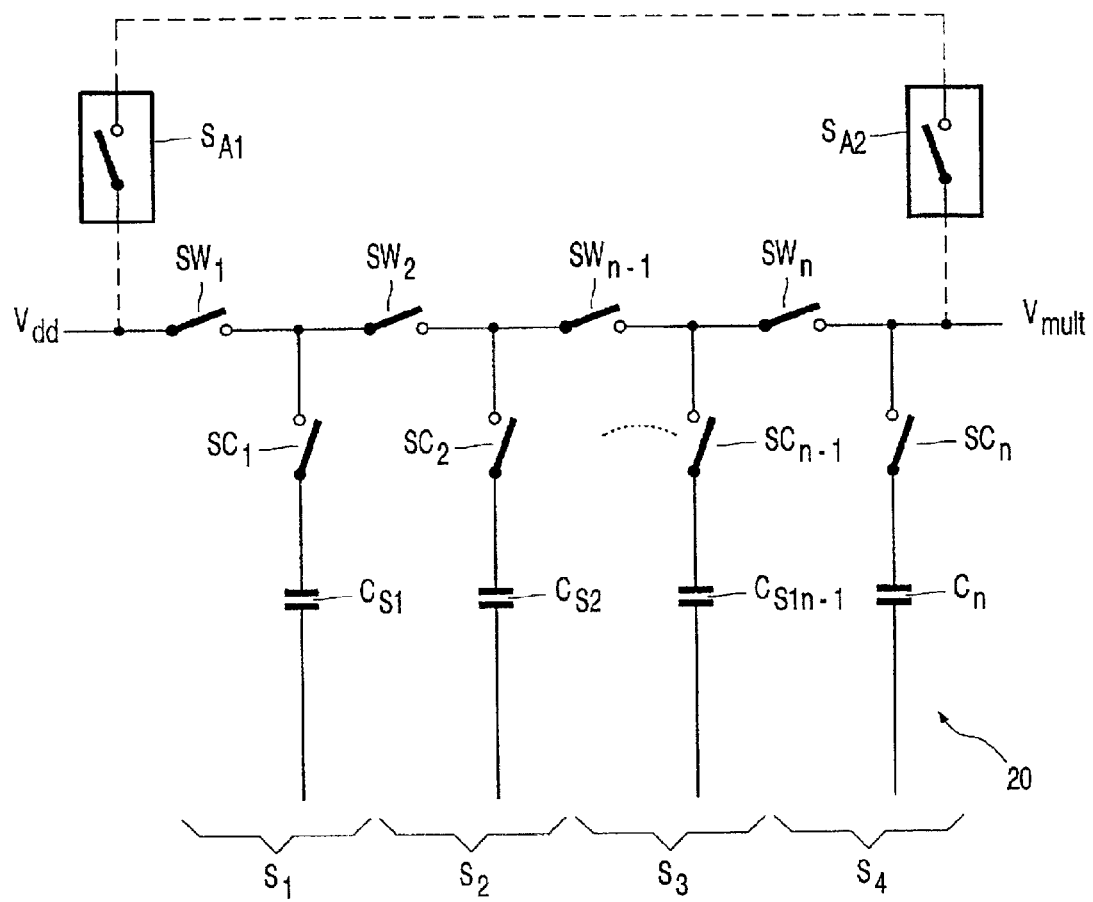

The invention will be described in detail hereinafter, by way of example, with reference to some Figures. Therein;

FIG. 1 shows an arrangement for driving a display unit without an additional start comparator, FIG. 2 shows a start sequence, FIG. 3 shows a display unit, FIG. 4 shows an arrangement for driving a display unit with a start comparator, and FIG. 5 shows an arrangement of a voltage multiplier with devices for the direct mode.

FIG. 1 shows an arrangement 15 for driving a display unit without a start comparator. The arrangement 15 for driving the display unit includes a voltage multiplier 20, a subvoltage generating unit 40, and a start control unit 30. The supply voltage Vdd 21 is applied to the voltage multiplier 20. The voltage multiplier 20 forms a higher voltage Vmult 22 from this supply voltage 21 by means of a plurality of pump stages. The start control unit 30 is provided so as to control the voltage multiplier 20. The start control unit 30 includes a comparator 31 and a logic unit 35. The start control unit 30 receives a subvoltage value Vdac 34 and a reference voltage Vref 33. This reference voltage is generated in a band gap circuit.

A band gap circuit is a circuit which is capable of generating a voltage whose value is imposed by the semiconductor physics. Such circuits are used for generating reference voltages. The voltage generated is determined by the semiconductor material used (Si, Ge, GaAs, InPh, etc.) and varies hardly in mass production. Moreover, a specific temperature dependency can thus be realized for the voltage generated.

The comparator 31 compares the supplied voltage values 31 and 34 and generates the activation signal 32. The activation signal 32 is applied to the voltage multiplier 20 and to the logic unit 35. The logic unit 35 generates the initial start signal 36. The logic unit 35 defines, for example, the multiplication factor M of the voltage multiplier 20. The logic unit 35 is also capable of switching on and off the supply voltage for the voltage multiplier 20.

Several subvoltage values Vteil are formed, via a voltage divider chain 42 which is realized, for example, as a resistor chain, from the voltage Vmult 22 generated by the voltage multiplier 20. One of the subvoltages Vteil is applied to the start control unit 30 as the signal 34 by means of the switching device 41 which is realized, for example, as a transistor array. The various subvoltage values Vteil are applied to the switching device 41 as well as, via the terminals A1–An, to an amplifier circuit 10 which is shown in FIG. 3 and serves to drive the rows Z of a display 2. The switching control device 41 is realized as a transistor array 41 which is shown in detail in FIG. 4 and is controlled via voltages Vop. Such voltages Vop are derived from the voltage Vmult 22. Vop may have the following voltage values: either ground (Vss) or Vmult. Vmult is defined by the control, but may at the most be M*Vdd, where M is the selected multiplication factor of the voltage multiplier. The activation signal 32 delivered by the comparator 31 is monitored by the logic unit 35. The self-adaptive start sequence for generating the initial start signal 36 is generated in said logic unit 35.

Such an arrangement 15 enables a fast and reliable start of the voltage multiplier 20. During the start time ts the voltage multiplier 20 operates in a direct mode. The supply voltage Vdd 21 is then applied directly to the output of the voltage multiplier 20, so that the output voltage Vmult 22 of the voltage multiplier 20 corresponds to the supply voltage Vdd 21.

FIG. 2 shows a diagram illustrating the variation of the initial start signal 36. The initial start signal 36 is generated by the logic unit 35. During the start time ts, being composed of a fixed time component tf, a monitoring time tc and a delay time td, the initial start signal 36 is applied to the voltage multiplier. After the fixed time tf of approximately 1 ms has elapsed, the activation signal 32 is controlled or monitored by the logic unit. When the activation signal 32 changes over to the logic state 1 or remains in this state during the time tc and an additional delay time td has elapsed, the voltage multiplier 20 is switched over from the direct mode to normal operation. The voltage multiplier 20 is controlled by the activation signal 32 as from that instant. The time tf as well as the time td may also be 0, depending on the relevant application. Consequently, the time in which the voltage multiplier operates in the direct mode can be kept very short.

FIG. 3 shows an arrangement which is provided with a driver circuit 1 and a display 2. The driver circuit 1 is provided with a memory 3 in which the image data is stored. The driver circuit 1 also includes an arrangement 15 for driving a display unit. A switching and amplifier device 10 applies the subvoltages generated by the arrangement 15 to a switch 7. A function generator 6 generates sets of orthogonal functions. Such sets of orthogonal functions are applied to the switch 7. The applied subvoltages and orthogonal functions are combined therein so as to be applied to the relevant rows Z of the display 2. The subvoltage values generated and the supply voltages Vmult, Vdd and Vss are also applied to the switch 8. The switch 8 also receives the orthogonal functions from the function generator 6. A column voltage is calculated in the switch 8 on the basis of the sets of orthogonal functions and the image data read out from the memory 9. From the number of available subvoltages this column voltage is then selected so as to be applied to the columns S of the display 2.

FIG. 4 shows an arrangement for driving, for example, a display device with an additional start comparator 37. Like the arrangement shown in FIG. 1, the present arrangement also includes a resistor chain 42 for generating subvoltage values, a voltage multiplier 20, a start control unit 30, a switching device 41 which is constructed as a transistor array, a logic block 48, a comparator 31 and a further logic block 38.

The start comparator 37 receives a subvoltage value 39. The start comparator 37 generates an output signal 44 which is applied to the logic block 38. The logic block 38 also receives the comparison signal 43 from the comparator 31. An OR-operation is performed in the logic block 38, resulting in an activation signal 32 being applied to the voltage multiplier 20. This arrangement, comprising two comparators 31 and 37, is capable of generating a start signal which enables reliable starting of the voltage multiplier 20. This arrangement requires an additional comparator 37 or start comparator and a further logic OR-operation 38. Because the subvoltage signal 39 is in any case a defined ratio of Vmult, the start control unit 30 produces a reliable activation signal 32. The control signals Vop are derived from Vmult. Vop may have voltage values of between Vss (ground) and Vmult. For low voltage values of Vmult (Startup), Vdac 34 is not defined. It is only when the voltage Vmult is high enough that Vdac becomes defined and the comparator 31 can take over the control of the voltage multiplier 20 by way of the signal 43. The ratio of the signal 39 to the voltage 29 Vmult is chosen to be such that the start comparator 37 activates the voltage multiplier 20 at least until Vmult is high enough so as to define Vdac. The function of the logic unit 48 in FIG. 4 deviates from that of the logic unit 35 in FIG. 1. For example, the multiplication factor M of the voltage multiplier 20 is defined in the logic unit 48. The logic unit 48 is also capable of switching on and off the voltage supply for the voltage multiplier 20.

FIG. 5 shows an arrangement of a voltage multiplier with devices for the direct mode. The voltage multiplier 20 is shown in very simplified form. It includes a plurality of stages S1 to Sn, each of which includes a switching device SWn, a switching device SCn and a capacitor CSn. In the direct mode the supply voltage Vdd is switched directly to the output Vmult. To this end, the switching devices SWn are closed. In order to keep the capacitive load small, it is advantageous to disconnect the capacitors of the stages from the direct connection of Vdd to Vmult. The switching devices SCn are provided for this purpose. They are opened in the direct mode. The switching devices SCn are closed or conductive in the normal mode. As an alternative for this arrangement, a direct connection may be provided between the input Vdd of the voltage multiplier and the output Vmult. To this end, there is provided at least one switching device SA1 which may be supplemented, if desired, with a further switching device SA2. The configuration to be selected is dependent on the relevant application; the space available in the circuit and the relevant additional current consumption must be taken into account for this choice.

An arrangement 15 in accordance with the invention can also be used for the voltage supply for flash memories or similar applications requiring a voltage that is higher than the voltage which can be delivered by the system supply voltage.

What is claimed is:

1. A circuit arrangement for generating at least one voltage value, which circuit arrangement includes a subvoltage generating unit and a voltage multiplier, the subvoltage generating unit being arranged to switch the voltage multiplier to a direct mode in order to control the voltage multiplier during a start time; the subvoltage generating unit comprising a plurality of intermediate nodes, each intermediate node formed by a series connection of a pair of resistors, and a plurality of switches, each switch coupled to one of the plurality of intermediate nodes;

wherein when the voltage multiplier is in direct mode the voltage multiplier is configured to connect a power supply node to an output of the voltage multiplier, and when the voltage multiplier is not in direct mode, the voltage multiplier is configured to disconnect the power supply node from the output of the voltage multiplier, and to connect the output of the voltage multiplier to an internal node for providing an internally generated output voltage.

2. The circuit arrangement as claimed in claim 1, characterized in that it is arranged to supply the voltage multiplier with an activation signal formed from a subvoltage generated by the subvoltage generating unit and from a reference signal, and that it is arranged to supply the voltage multiplier with an initial start signal formed from the activation signal during the start time.

3. The circuit arrangement as claimed in claim 1, characterized in that there is provided a start control unit for controlling the voltage multiplier, which start control unit includes at least one comparator and a logic unit, the comparator being arranged to compare a subvoltage generated by the subvoltage generating unit and a reference voltage, and to generate the activation signal, the logic unit generating an initial start signal so as to switch the voltage multiplier to a direct mode.

4. The circuit arrangement as claimed in claim 1, characterized in that the start time during which the voltage multiplier operates in a direct mode is adaptive adjustable.

5. The circuit arrangement as claimed in claim 1, characterized in that a series connection of switching devices of the stages in the voltage multiplier is closed in the direct mode, and that the capacitors associated with the stages can be disconnected.

6. The circuit arrangement of claim 1, wherein the plurality of switches comprises a plurality of transistors.

7. The circuit arrangement of claim 1, further comprising:
a first comparator coupled to the plurality of switches; and
a reference voltage source coupled to provide a reference voltage to the first comparator.

8. The circuit arrangement of claim 7, wherein the reference voltage source is a band gap circuit.

9. The circuit arrangement of claim 7, further comprising:
a second comparator coupled to the plurality of switches, and further coupled to the reference voltage source; and
a logic circuit coupled to receive an output signal from each of the first and second comparators;
wherein the first comparator and the second comparator receive different subvoltages from the plurality of switches.

10. A circuit arrangement for driving a display device, a subvoltage generating unit and a voltage multiplier, the subvoltage generating unit being arranged to control the voltage multiplier by switching the voltage multiplier to a direct mode by means of an initial start signal during a start time; the subvoltage generating unit comprising a plurality of intermediate nodes, each intermediate node formed by a series connection of a pair of resistors, and a plurality of switches, each switch coupled to one of the plurality of intermediate nodes;

wherein when the voltage multiplier is in direct mode the voltage multiplier is configured to connect a power supply node to an output of the voltage multiplier, and when the voltage multiplier is not in direct mode, the voltage multiplier is configured to disconnect the power supply node from the output of the voltage multiplier, and to connect the output of the voltage multiplier to an internal node for providing an internally generated output voltage.

11. A circuit arrangement comprising: a voltage multiplier for generating at least one voltage value, comprising a series connection of the first plurality of stages with first switching devices, second switching devices and capacitors, characterized in that during a start time the first switching devices are closed and by that a supply voltage at a first input of the voltage multiplier is switched to an output of the voltage multiplier; and a subvoltage generating unit, coupled to the voltage multiplier, comprising a plurality of intermediate nodes, each intermediate node formed by a series connection of a pair of resistors, and a plurality of switches, each switch coupled to one of the plurality of intermediate nodes;

wherein subsequent to the start time, the first switches are opened and the supply voltage is disconnected from the output of the voltage multiplier.

12. A display unit for the display of image data, which display unit includes an arrangement for driving the display unit with a subvoltage generating unit and a voltage multiplier, the subvoltage generating unit being arranged to switch the voltage multiplier to a direct mode by means of at least one signal during a start time; the subvoltage generating unit comprising a plurality of intermediate nodes, each intermediate node formed by a series connection of a pair of resistors, and a plurality of switches, each switch coupled to one of the plurality of intermediate nodes;

wherein when the voltage multiplier is in direct mode, the voltage multiplier is configured to connect a power supply node to an output of the voltage multiplier, and when the voltage multiplier is not in direct mode, the voltage multiplier is configured to disconnect the power supply node from the output of the voltage multiplier, and to connect the output of the voltage multiplier to an internal node for providing an internally generated output voltage.

13. An electronic apparatus which is provided with a display unit for the display of image data and also with an arrangement for driving the display unit, which arrangement includes a subvoltage generating unit and a voltage multiplier, the subvoltage generating unit being arranged that at least one signal controls the voltage multiplier and that the voltage multiplier can be switched to a direct mode during a start time; the subvoltage generating unit comprising a plurality of intermediate nodes, each intermediate node formed by a series connection of a pair of resistors, and a plurality of switches, each switch coupled to one of the plurality of intermediate nodes;

wherein when the voltage multiplier is in direct mode the voltage multiplier is configured to connect a power supply node to an output of the voltage multiplier, and when the voltage multiplier is not in direct mode, the voltage multiplier is configured to disconnect the power supply node from the output of the voltage multiplier, and to connect the output of the voltage multiplier to an internal node for providing an internally generated output voltage.

14. A method of starting a circuit arrangement which includes a subvoltage generating unit and a voltage multiplier, in which method a first subvoltage value and a reference voltage are compared so as to generate an activation signal, the voltage multiplier being switched to a direct mode during a start time which is adaptively adjusted by monitoring an activation signal; the subvoltage generating unit comprising a plurality of intermediate nodes, each intermediate node formed by a series connection of a pair of resistors, and a plurality of switches, each switch coupled to one of the plurality of intermediate nodes;

wherein when the voltage multiplier is in direct mode the voltage multiplier is configured to connect a power supply node to an output of the voltage multiplier, and when the voltage multiplier is not in direct mode, the voltage multiplier is configured to disconnect the power supply node from the output of the voltage multiplier, and to connect the output of the voltage multiplier to an internal node for providing an internally generated output voltage.

15. The method of claim 14, further comprising producing the reference voltage as an output of a band gap circuit.

16. The method of claim 15, wherein the subvoltage generating unit produces a plurality of subvoltages; and further comprising selecting the first subvoltage value by means of a switching device.

17. The method of claim 16, further comprising selecting a second subvoltage by means of the switching device and concurrently providing the first subvoltage to a first comparator and the second subvoltage to a second comparator.

18. The method of claim 14, further comprising operating a logic circuit such that a signal is supplied to the voltage multiplier and the voltage multiplier, responsive to the signal, changes a voltage multiplication factor.

* * * * *